(12) United States Patent
Lee et al.

(10) Patent No.: US 8,126,295 B2
(45) Date of Patent: Feb. 28, 2012

(54) IMAGE PROCESSING APPARATUS AND METHOD OF USING THE SAME

(75) Inventors: Eul-hwan Lee, Seongnam-si (KR);
Kyeong-man Kim, Suwon-si (KR);
Goo-soo Gahang, Yongin-si (KR);
Won-kyoung Cho, Jeonju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1155 days.

(21) Appl. No.: 10/942,972

(22) Filed: Sep. 17, 2004

(65) Prior Publication Data
US 2005/0074173 A1    Apr. 7, 2005

(30) Foreign Application Priority Data
Oct. 6, 2003   (KR) .................. 10-2003-0069141

(51) Int. Cl.
*G06K 9/60*   (2006.01)

(52) U.S. Cl. ........... 382/307; 341/67; 348/458; 358/1.1; 358/1.9; 379/387.01; 382/232; 382/240

(58) Field of Classification Search ................ 382/307
See application file for complete search history.

(56) References Cited

U.S. PATENT DOCUMENTS

| | | | | |
|---|---|---|---|---|
| 5,323,247 A | * | 6/1994 | Parker et al. | 358/3.08 |
| 5,739,920 A | * | 4/1998 | Nakajima et al. | 382/240 |
| 6,956,511 B2 | * | 10/2005 | Thomas et al. | 341/67 |
| 2001/0017667 A1 | * | 8/2001 | Frink et al. | 348/458 |
| 2002/0051148 A1 | * | 5/2002 | Izumi | 358/1.9 |
| 2004/0046972 A1 | * | 3/2004 | Shibao | 358/1.1 |
| 2005/0025366 A1 | * | 2/2005 | Jeong | 382/232 |
| 2006/0147028 A1 | * | 7/2006 | Hancock | 379/387.01 |

FOREIGN PATENT DOCUMENTS

JP    6-205228    7/1994
(Continued)

OTHER PUBLICATIONS

Japanese Patent Office Action mailed Apr. 21, 2009 corresponding to Japanese Patent Application No. 2004-294098.

*Primary Examiner* — Anand Bhatnagar
*Assistant Examiner* — Tsung-Yin Tsai
(74) *Attorney, Agent, or Firm* — Staas & Halsey LLP (57) ABSTRACT

An image processing apparatus and an image processing method that reduce data transmission time by transmitting data between internal memories of a codec without passing through a system memory. Reducing the number of accesses to the system memory increases processing speed, and reduces the load of a main processor, when image data is to be encoded or decoded. The apparatus includes: an image processor processing sensing data input from various sensors and generating image data; a first codec encoding or decoding the image data using a first encoding method and generating encoded data or decoded data; a second codec encoding or decoding the image data using a second encoding method and generating encoded data or decoded data; a system memory storing the image data, the encoded data, and the decoded data; a main processor controlling the other components; and a router through which the image data is transmitted to the first codec or the second codec to encode the data, or through which the encoded data is transmitted between the first codec and the second codec.

25 Claims, 4 Drawing Sheets

FOREIGN PATENT DOCUMENTS

| | | |
|---|---|---|
| JP | 07-046411 | 2/1995 |
| JP | 7-307870 | 11/1995 |
| JP | 08-125818 | 5/1996 |
| JP | 8-204925 | 8/1996 |
| JP | 09-298667 | 11/1997 |
| JP | 10-75447 | 3/1998 |
| JP | 10-173935 | 6/1998 |
| JP | 11-4350 | 1/1999 |

* cited by examiner

IMAGE PROCESSING APPARATUS AND METHOD OF USING THE SAME

CROSS-REFERENCE TO RELATED APPLICATION

This application claims the priority of Korean Patent Application No. 2003-69141, filed on Oct. 6, 2003, in the Korean Intellectual Property Office, the disclosure of which is incorporated herein in its entirety by reference.

BACKGROUND OF THE INVENTION

1. Field of the Invention

The present invention relates to a multi-functional image processing apparatus, and more particularly, to an image processing apparatus and an image processing method that reduce data transmission time by transmitting data between internal memories of a codec without passing through a system memory, and improve the processing speed by reducing the number of times the system memory is accessed. The present invention also reduces a load of a main processor for controlling the system memory when image data in binary form read by a sensor such as a charge coupled device is to be encoded, or decoded data transmitted from a JBIG codec or an MH/MR/MMR codec is to be encoded using another encoding method.

2. Description of the Related Art

In general, a digital copying machine or a digital multi-function machine performs various functions such as scanning, printing, copying, and fax transmitting/receiving. In order to perform these functions, an image processing apparatus includes a central processor, an image processor, a codec, and a memory unit. Recently, an application-specific integrated circuit (ASIC) performing all of the functions has been used.

Figure 1:
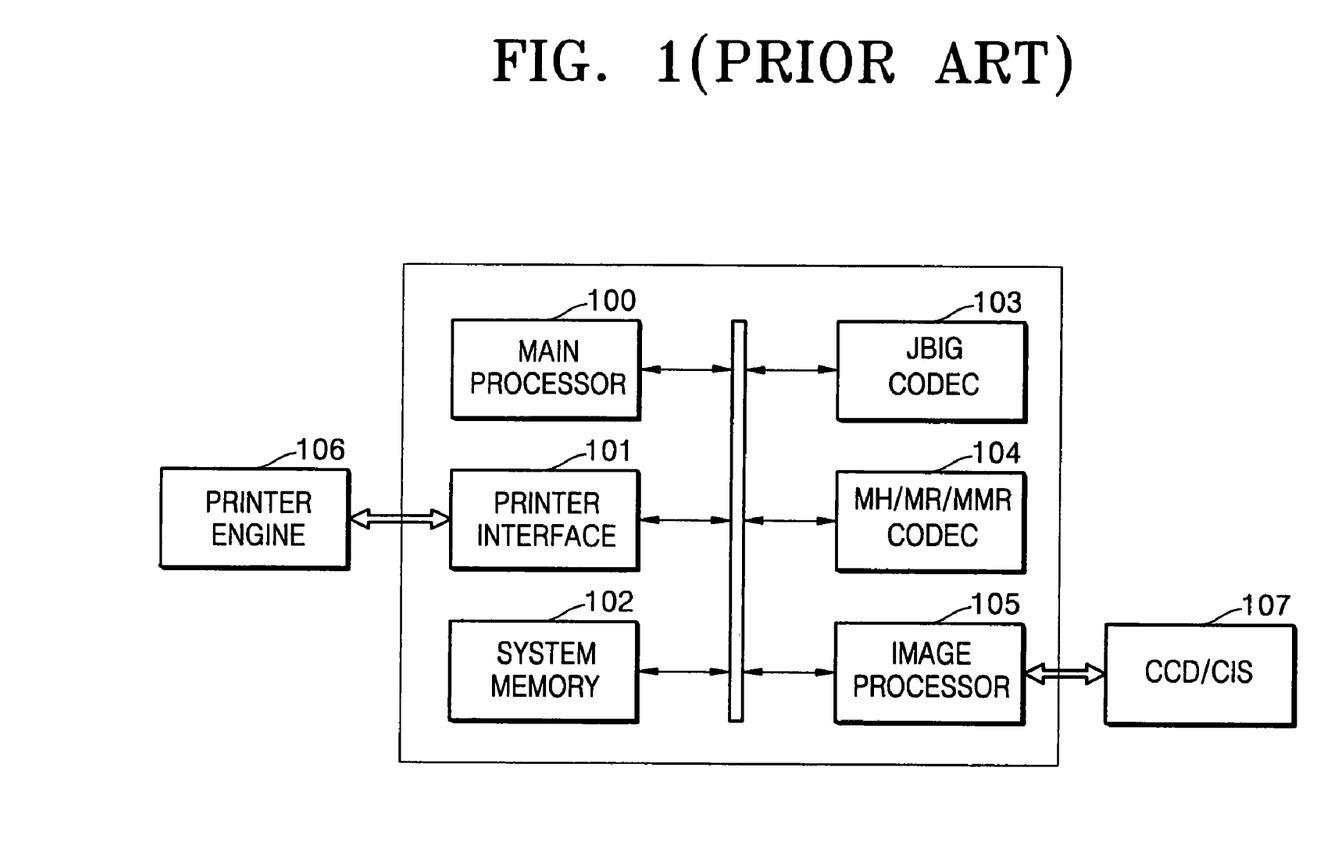
FIG. 1 is a block diagram of a conventional image processing apparatus.

FIG. 1 is a block diagram of a conventional image processing apparatus.

Referring to FIG. 1, the image processing apparatus includes a main processor 100, an image processor 105, a modified Hoffman (MH)/modified READ (MR)/modified MR (MMR) codec 104, a joint bi-level image experts group (JBIG) codec 103, and a printer interface 101.

The main processor 100 controls the entire image processing apparatus.

The image processor 105 converts analog data read by a charge-coupled device (CCD) 107 into digital data, performs a required image processing operation, and converts a continuous gray level value into a binary value.

The MH/MR/MMR codec 104 and the JBIG codec 103 encode or decode image data into or from MH/MR/MMR codec form or JBIG codec form.

In a scanning operation, sensing data read through the CCD 107 is transmitted to the image processor 105, and the data is transmitted from the image processor 105 to a system memory 102 controlled by the main processor 100 via a direct memory access (DMA).

In a printing operation, the data read by the system memory 102 is transmitted to the image processor 105, and the data output from the image processor 105 is transmitted to a printer engine unit 106 via the printer interface 101.

In a copying operation, the sensing data read by the CCD 107 is transmitted to the image processor 105, and image data output from the image processor 105 is transmitted to the printer engine unit 106 via the printer interface 101.

In a fax transmitting operation, the image data output from the image processor 105 or decoded data stored in the system memory 102 are encoded in MH/MR/MMR or JBIG form, and stored in the system memory 102, or transmitted externally.

In a fax receiving operation, data received is stored in the system memory 102, the MH/MR/MMR codec 104 or the JBIG codec 103 decodes the stored data and sends the decoded data to the printer engine unit 106 via the printer interface 101.

The fax transmitting/receiving operation is performed at 9600 bps via a general telephone line. Thus, in order to transmit a large amount of information data via a general telephone line, the amount of data representing the information should be as small as possible.

Therefore, the data is MH/MR/MMR or JBIG-encoded, and transmitted. Methods of transmitting/receiving the fax can be classified into a memory send/receive method and a direct send/receive method.

Memory Send/Receive Method:

A document is scanned, encoded, and stored by a sending side, and then sent to a receiving side. According to this method, the sending side and the receiving side should use a predetermined encoding method. Most general facsimiles use MH, MR, and MMR encoding methods, however, facsimiles supporting JBIG encoding have recently been developed. The JBIG encoding has a higher encoding rate than MH, MR, and MMR encoding, thus reducing the amount of sent data. The memory send/receive method is not effective if the sending side sends the document after MH, MR, or MMR encoding without considering the decoding operation of a receiving side that supports the JBIG encoding.

Direct Send/Receive Method:

The sending side recognizes the decoding method supported by the receiving side, and then transmits the data using the encoding method that can be decoded by the receiving side. If the receiving side supports JBIG encoding, the sending side JBIG encodes the data and sends the encoded data. According to the direct send/receive method, if the document scanned by the sending side is stored in the memory in JBIG form and the receiving side only supports MMR encoded data, or if the sending side wants to send the MMR encoded data as JBIG encoded data, the data must be decoded and re-encoded in a form that is supported by the receiving side. The decoding and re-encoding operations can be performed in the following way in the direct send/receive method.

When the main processor 100 transmits a decoding start message of page unit (DEC_SOP) to the MH/MR/MMR codec 104, the MH/MR/MMR codec 104 reads the MMR encoded data and stores it in the system memory 102. When the decoding operation is complete, the MH/MR/MMR codec 104 transmits an interrupt message (DEC_NT) that notifies the completion of the operation to the main processor 100.

Then, the main processor 100 transmits an encoding start message of page unit (ENC_SOP) to the JBIG codec 103, and the JBIG codec 103 reads the decoded data from the system memory 102, performs the re-encoding operation using the JBIG encoding scheme, and stores the encoded data in the system memory 102. When the re-encoding operation is complete, the JBIG codec 103 sends an interrupt message (ENC_INT) to the main processor 100.

When the fax is sent/received in the direct send/receive method, the encoding and re-encoding operations of the data stored in the system memory 102 should be performed.

For example, if it is assumed that the MMR-encoded document stored in the system memory 102 is re-encoded and sent, the MMR memory codec 104 directly reads the MMR-encoded data stored in the system memory 102 using a direct memory access (DMA) sending method. Then, the read data is decoded and transmitted from the system memory 102 using the DMA method. In addition, the JBIG codec 103 directly reads the decoded data using the DMA method to perform the encoding operation, and the encoded data is stored in the system memory 102 using the DMA method and transmitted to the receiving side.

Here, reading and storing processes of the data in the system memory 102 are required to decode the data, and the reading and storing processes must be performed to re-encode the data. Also, the main processor 100 must effectively control the data stored in the system in the decoding and re-encoding processes. Here, if the process of storing the decoded data in the system memory 102 and the process of reading the data from the system memory 102 can be removed, the number of times that the system memory 102 is accessed can be reduced, and the entire function of the system would be improved and the data stored in the system memory 102 could be easily controlled.

In the fax sending operation, transmit terminal identification (TTI) information is added to the top of the document being sent. The TTI includes date, time, company name, fax number, and machine identification. When it is assumed that the document data that will be sent is stored in the system memory 102 using the JBIG encoding method and the TTI is stored in the system memory 102 in a bitmap form, a new document is formed by adding the sending document to the TTI information and transmitted after being encoded.

Therefore, the encoded sending document data is decoded and stored in the system memory 102, the TTI information stored in the bitmap form and the decoded document are re-encoded and both stored in the system memory 102.

Thus, in the general image processing apparatus, the data encoded in a predetermined type or the image data input from the image processor is stored in the system memory in order to be encoded or re-encoded, and then the data stored in the system memory must be re-encoded. Thus, the load of the system memory increases, and the efficiency of entire system is lowered.

The present invention has similar features to Japanese Laid-open Patent No. Hei 07-307870, in that the compression data is code-converted in another compression method. However, the present invention provides an apparatus that can combine non-compressed data and compressed data, as well as an apparatus that code converts the compressed data.

SUMMARY OF THE INVENTION

The present invention provides an image processing apparatus and an image processing method that increase an encoding speed by reducing the number of times a system memory is accessed and improve an encoding function by reducing a load of a main processor for controlling the memory when image data formed by scanning a document using a sensor, such as a charge coupled device (CCD), is encoded or when encoded data read from the system memory is re-encoded using another encoding method.

According to an aspect of the present invention, there is provided a multi-functional image processing apparatus including: an image processor processing sensing data input from various sensors and generating image data; a first codec encoding or decoding the image data using a first encoding method and generating encoded data or decoded data; a second codec encoding or decoding the image data using a second encoding method and generating encoded data or decoded data; a system memory storing the image data, the encoded data, and the decoded data; a main processor controlling other components of the apparatus; and a router through which the image data is transmitted to the first codec or the second codec to encode the data, or through which the encoded data is transmitted between the first codec and the second codec.

According to an aspect of the present invention, the first encoding method may be a joint bi-level image experts group codec method, and the second encoding method may be an MH/MR/MMR codec method.

According to an aspect of the present invention, each of the first codec and the second codec may include: a data input unit receiving one of the image data, the encoded data, or the decoded data to encode; a decoding unit that performs decoding of the encoded data; an encoding unit encoding the image data or the decoded data; a data output unit outputting either the encoded data or the decoded data; an encoding line memory storing data for the encoding; and a decoding line memory storing data for the decoding.

According to an aspect of the present invention, the encoding line memory may include a storage line reading and storing the image data or the decoded data; a coding line encoding the image data or the decoded data; and a reference line that is a reference of the encoding operation.

According to an aspect of the present invention, the decoding line memory may include a storage line reading and storing the image data or the decoded data; a reference line that is a reference of the decoding operation; and a reading line outputting the decoded data to an external apparatus.

According to an aspect of the present invention, the router may transmit the decoded data to the second codec to be encoded when the decoded data is originally encoded using the first encoding method, and the router transmits the decoded data to the first codec to be encoded when the decoded data is originally encoded using the second encoding method.

According to an aspect of the present invention, the router may transmit the image data to the first codec or to the second codec from the image processor in order to encode the image data.

According to another aspect of the present invention, there is provided an image processing method, performed by an image processing apparatus including an image processor processing sensing data input from various sensors and generating image data, a first codec encoding or decoding the image data using a first encoding method and generating first encoded data or first decoded data, a second codec encoding or decoding the image data using a second encoding method and generating second encoded data or second decoded data, a system memory storing the image data, the first and second encoded data, and the first and second decoded data, a main processor controlling other components of the apparatus, and a router through which the image data is transmitted to the first codec or the second codec to encode the image data, or through which the first and second encoded data are transmitted between the first codec and the second codec. The method includes processing the sensing data input by the various sensors to form image data; transmitting the image data to the first codec or the second codec; and encoding the image data using the first encoding method or using the second encoding method.

According to another aspect of the present invention, the first encoding method may be a joint bi-level image experts group codec method, and the second encoding method may be an MH/MR/MMR codec method.

According to an another aspect of the present invention, each of the first codec and the second codec may include a data input unit receiving the image data to perform the encode operation; an encoding unit encoding the image data; a data output unit outputting the encoded data; and an encoding line memory storing various data for the encoding.

According to an aspect of the present invention, in the transmitting the image data, the image data may be directly transmitted to the first codec or the second codec from the image processor without passing through the system memory.

According to an aspect of the present invention, the encoding of the data may include receiving the image data and storing the image data in the encoding line memory when an encoding start message is input to the first or second codec by the main processor; and performing the encoding operation on a line unit when the encoding line memory is in a full state.

According to a still another aspect of the present invention, there is provided an image processing method processing sensing data input from various sensors and generating image data, encoding or decoding, through a first codec, the image data using a first encoding method and generating first encoded data or first decoded data, encoding or decoding, through a second codec, the image data using a second encoding method and generating second encoded data or second decoded data, storing the image data, the first and second encoded data, and the first and second decoded data, and transmitting the image data to the first codec or the second codec to encode the image data, or transmitting the first and second encoded data between the first codec and the second codec. The method according to this aspect of the invention includes decoding the first and second encoded data stored in system memory; transmitting the first and second decoded data to the first codec or the second codec; and encoding the first and second decoded data using the first encoding method or the second encoding method.

According to another aspect of the present invention, the first encoding method may be a joint bi-level image experts group codec method, and the second encoding method may be an MH/MR/MMR codec method.

According to another aspect of the present invention, the first codec or second codec may include a data input unit receiving the image data or the encoded data performing the encoding operation; a decoding unit decoding the encoded data; an encoding unit encoding the image data or the decoded data; a data output unit outputting the encoded data; an encoding line memory storing various data used for the encoding operation; and a decoding line memory storing various data used for the decoding operation.

According to another aspect of the present invention, the decoding of data may include reading the encoded data performing the encoding operation from the system memory; generating decoded data by decoding the encoded data read from the system memory; and storing the decoded data in the decoding line memory.

According to another aspect of the present invention, the transmitting of the decoded data may include directly transmitting the decoded data to the first codec or the second codec via the router without passing through the system memory.

According to another aspect of the present invention, the encoding may include reading the decoded data from the decoding line memory of the first codec or the second codec; storing the decoded data in the encoding line memory of the second codec; and performing the encoding operation on a line unit of the decoded data if the encoding line memory is in a full state.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE EMBODIMENTS

Hereinafter, an image processing apparatus and an image processing method according to an embodiment of the present invention will be described with reference to accompanying figures. It should be noted that same reference numerals are used for same elements throughout the figures. Certain detailed elements of circuits are shown in the following description, however, the present invention can be embodied without these certain elements. In addition, detailed descriptions of features well known to these skilled in the art will be omitted if the descriptions are not relevant to the present invention.

Figure 2:
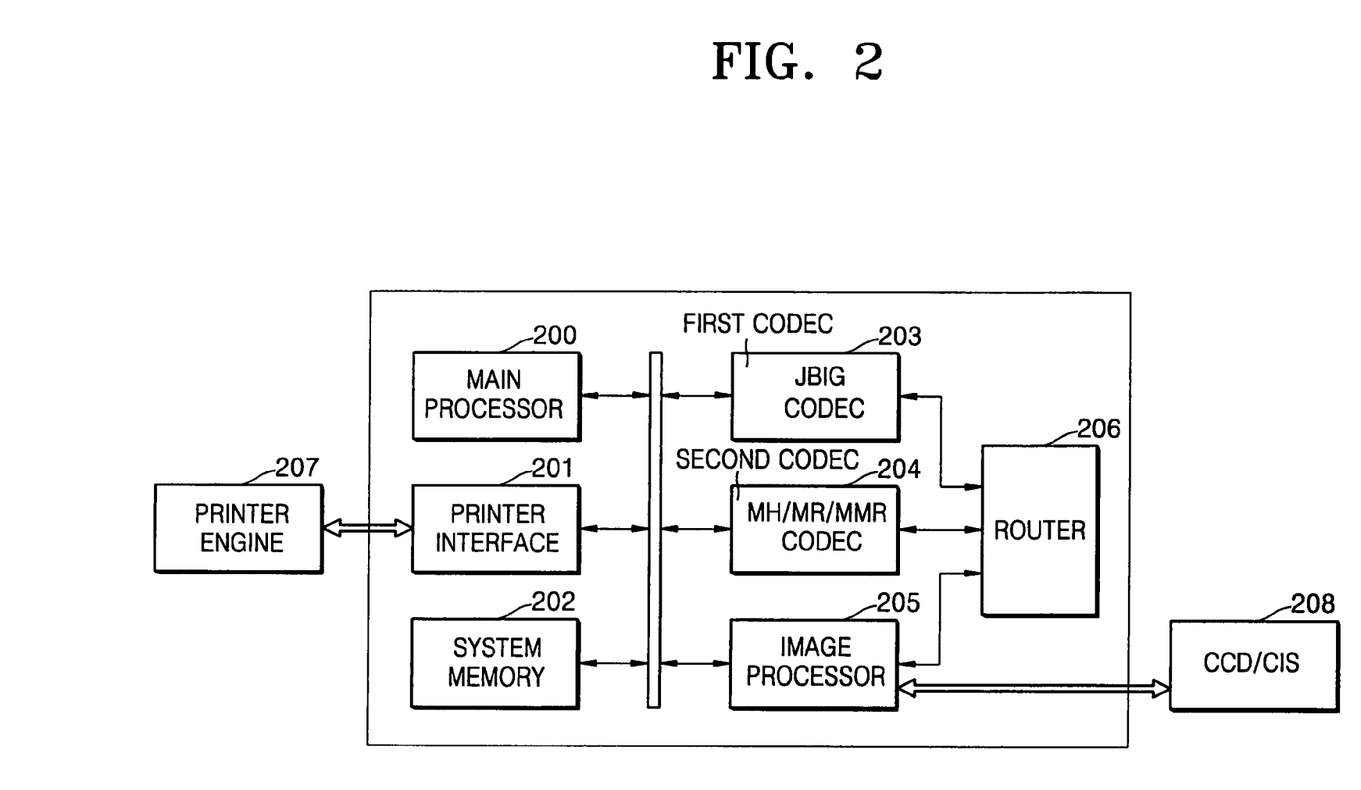
FIG. 2 is a block diagram of an image processing apparatus according to an embodiment of the present invention.

FIG. 2 is a block diagram of an image processing apparatus according to an embodiment of the present invention. Referring to FIG. 2, the apparatus includes a main processor 200, a joint bi-level image experts group (JBIG) codec 203, a modified Hoffman (MH)/modified read (MR)/modified MR (MMR) codec unit 204, an image processor 205, a system memory 202, a printer interface 201, and a router 206.

The JBIG codec 203 performs JBIG encoding/decoding of image data or decoded data, and the MH/MR/MMR codec 204 performs International Telegraph and Telephone Consultative Committee Group 3 and Group 4 (CCITT G3/G4) encoding and decoding operations.

The main processor 200 controls the entire image processing apparatus.

The image processor 205 performs image processing operations such as a gamma correction and shading correction, image quality improvement and binary gray scale conversion.

The router 206 transmits data between the image processor 205 the JBIG codec 202, and the MH/MR/MMR codec 204. The router 206 transmits a signal output from the image processor 205, the JBIG codec 203, or the MH/MR/MMR codec 204 to the JBIG codec 203 or to the MH/MR/MMR codec 204 for the encoding operation.

The system memory 202 stores data sensed by a sensor, and data for encoding/decoding.

Figure 3:
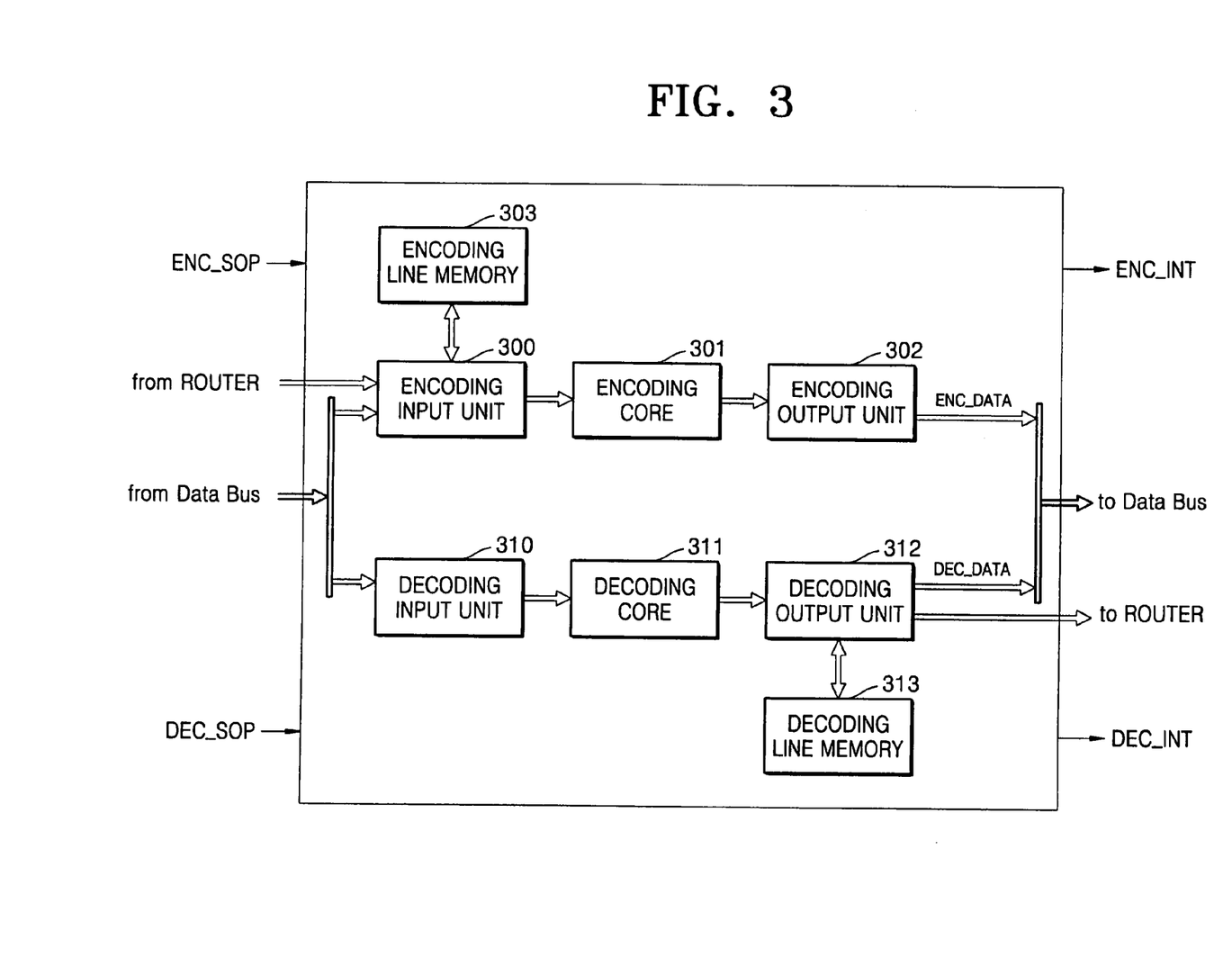
FIG. 3 is a block diagram of a codec.

FIG. 3 is a block diagram of the codec. The JBIG codec 203 and the MH/MR/MMR codec 204 have the same structure as shown in FIG. 3, and only one of the codecs will be described.

The codec can be divided into an encoding unit that performs the encoding, and a decoding unit that performs the decoding. The encoding unit includes an encoding input unit 300 that receives the data for encoding, an encoding core 301 that encodes the data, an encoding output unit 302 that outputs first or second encoded data, and an encoding line memory (ELM) 303 that stores the first or second data to be encoded. The decoding unit includes a decoding input unit 310 that receives the first or second encoded data to perform the decoding operation, a decoding core 311 that decodes the first or second encoded data, a decoding output unit 312 that outputs first or second decoded data, and a decoding line memory (DLM) that stores the first or second decoded data. Although it is not shown, the decoding unit includes a controller that receives various messages input from an external device (for example, ENC_SOP and ENC_SOL) to control the elements in the codec, and outputs various messages (for example, ENC_INT and DEC_INT).

The image processing apparatus shown in FIG. 2 can perform a variety of functions such as scanning, printing, copying, and fax sending/receiving.

In the scanning operation, sensing data read by a sensor such as a charge-coupled device (CCD) is transmitted to the image processor 205, and image data that has a continuous gray scale or binary data output by the image processor is transmitted to the system memory 202, which is controlled by the main processor using a direct memory access (DMA) method.

In the printing operation, data read from the system memory 202 using the DMA method is transmitted to the image processor 205, and then image data output by the image processor 205 is transmitted to the printer engine 207 via the printer interface 201.

In the copying operation, the sensing data read by the sensor is transmitted to the image processor 205, and the image data output by the image processor 205 is transmitted to the printer engine 207 via the printer interface 201.

In the fax sending operation, the image data output from the image processor 205 or the data stored in the system memory 202 is read by one of the codecs 203 and 204 using the DMA method to encode the data, and the encoded data is stored in the system memory 202 or transmitted using the DMA method.

In the fax receiving operation, received data is stored in the system memory 202, transmitted to one of the codecs 203 and 204 using the DMA method to decode the data, and transmitted to the printer engine 207 via the printer interface 201.

Encoding and decoding methods used in the image process apparatus of FIG. 2 includes a single-encoding method, a single-decoding method, a scan-to-encoding method, and a decoding-to-encoding method.

In the single-encoding method, the data stored in the system memory 202 is encoded, and in the single-decoding method, the encoded data stored in the system memory 202 is decoded.

In the scan-to-encoding method, the scanned image is decoded by one of the codecs 203 and 204, and in the decoding-to-encoding method, the encoded data is decoded using one of the JBIG and re-encoded using the other encoding scheme.

The decoding-to-encoding method is used when the encoded data stored in the system memory must be re-encoded in another encoding scheme required by the receiving side.

In the present embodiment, the encoding and decoding of a codec can be performed simultaneously in the decoding-to-encoding operation. That is, the data decoded by a predetermined codec can be transmitted to a line memory (ELM or DLM) of the other codec via the router 206 and encoded. Three kinds of data are input into the router 206, that is, the image data input from the image processor 205, decoded data input from the decoding output unit 312 of the JBIG codec 203, and decoded data input from the decoding output unit 312 of the MH/MR/MMR codec 204.

The image data or decoded data input from the above three sources is input to the JBIG codec 203 or the MH/MR/MMR codec 204 to be encoded in a predetermined form according to control register information received by the router 206. That is, because of the router 206, the data can be transmitted from the image processor 205 to the JBIG codec 203, from the image processor 205 to the MH/MR/MMR codec 204, from the MH/MR/MMR codec 204 to the JBIG codec 203, or from the JBIG codec 203 to the MH/MR/MMR codec 204 without passing through the system memory 202.

The codec operates after receiving a signal (ENC_SOP and DEC_SOP) notifying start of paging operation, and generates start signals (ENC_SOL and DEC_SOL) and ending signals (ENC_INT and DEC_INT) in strip units and line units.

The MH/MR/MMR codec 204 has one strip per one page, while the JBIG codec may include a plurality of strips per page. Each of the strips includes a plurality of lines.

The main processor 200 sets a size of an image which will be encoded or other parameters in a special function register (not shown) in the codec, and transmits a signal (ENC_SOP) to initiate the encoding of one page to the codec. The codec starts the encoding operation according to the set parameters, and generates an ENC_INT message that notifies the main processor 200 when the encoding of one page is completed.

When the codec receives ENC_SOP from the main processor 200, it initializes all registers related to the encoding operation and the ELM 303 therein.

Figure 4:
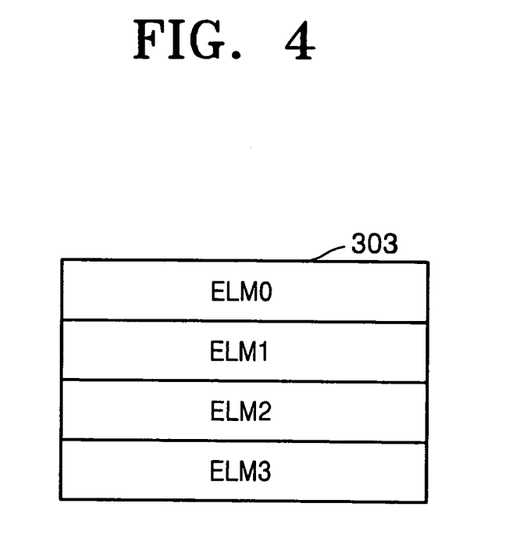
FIG. 4 is a view for describing structure of an encoding line memory.

FIG. 4 illustrates usage of the ELM 303 including four lines. The ELM 303 can be used as a storage line (WL) for storing image data, a coding line performing the encoding operation, and a reference line that is a reference for the encoding operation.

Since MH encoding is a one-dimensional encoding operation, the coding line and the storage line are used. Two-dimensional encoding operations such as MR encoding and MMR encoding uses three line memories, that is, the coding line, the reference line, and the storage line.

In the JBIG encoding operation, one of a two line template and a three line template can be selected in order to construct the context. When the two line template is used, three lines, that is, the storage line WL, the coding line CL, and the reference line are used as in the MR/MMR encoding operations, and when the three line template is used, four line memories, that is, the storage line, the coding line, a first reference line RL1, and a second reference line RL2 are used.

Table 1 shows an operational status of the ELM 303. ELM0 through ELM3 denote physically fixed line memories, and usage of the storage line WL, the coding line CL, the first reference line RL1, and the second reference line RL2 are denoted.

TABLE 1

| Line number | Line 1 | Line 2 | Line 3 | Line 4 | Line 5 | Line 6 | ... |
|---|---|---|---|---|---|---|---|
| ELM0 | WL | CL | RL1 | RL2 | WL | CL | ... |
| ELM1 |    | WL | CL | RL1 | RL2 | WL | ... |
| ELM2 | RL2 |    | WL | CL | RL1 | RL2 | ... |
| ELM3 | RL1 | RL2 |    | WL | CL | RL1 | ... |

When the coding line CL is in a full state, ENC_SOP, a control command for starting the line encoding, is generated. ENC_SOP is not generated until the coding line becomes full.

When ENC_SOP is generated, data corresponding to a present line is encoded, and data corresponding to a next line is stored in the line memory storage line WL. When the encoding operation of the present line is complete, the ENC_EOL indicating that the encoding of the present line is completed is generated, the data is stored in the storage line WL, and the storage line WL is in the full state.

The encoding input unit 300 receives the image data required to encode the line and stores the image data in the storage line WL of the line memory. The image data can be input from the system memory 202, or the router 206. When the image data is received using the DMA method from the system memory 202, communication between the encoding input unit 200 and the system memory 202 is made by sending/receiving a request message and an acknowledge message.

If the data bus is transmitted in 32-bit units and the number of bursts is 4, data transmission of 128 bits (32 bits×4 times) is performed when one request message and one acknowledge message are sent/received.

The encoding input unit 300 stores the transmitted decoded data in the ELM 303. If one line of the encoding document includes a maximum of 8192 pixels, the size of the line in the ELM 303 is 256×32 pixels.

The encoding core 301 performs the encoding operation by reading the data in the coding line corresponding to the present line and the previous line of the ELM 303, the first reference line RL1, and the second reference line RL2. Since the coding line is not in the full state when the first line is stored in the ELM0, the second line is stored in the ELM1 303 and the first line is encoded when the coding line is in a full state.

When the encoding operation starts, encoding data generated by the encoding core 301 is sent to the encoding output unit 302. The encoding output unit 302 may include a codeword buffer (not shown) that stores a codeword transmitted from the encoding core 301, and two 128-bit registers (not shown) that transmit the codeword to the system memory 202.

The codeword buffer receives the codeword output from the encoding core 302, aligns the codeword in 32-bit units, and stores the codeword in the 128-bit register. The two 128-bit registers use a first in first out (FIFO) method, that is, the data can be output from the system memory 202 in 4 bursts, 32 bits per burst using the DMA method.

When one 128-bit register is in a full state, the request message and the acknowledge message are transmitted between the system memory 202 and the 128-bit register so that the encoded data can be transferred to the system memory 200, and the other 128-bit register waits for the data to be input from the codeword buffer.

When the encoding of one line is complete, the storage line is in a full state. If ENC_SOL is generated and the storage line is in a full state, memory information representing the storage line, the coding line, and the reference line is corrected in order to encode the next line.

That is, the storage line is changed into a coding line, and the coding line is in a full state. The line encoding operation is performed until the last line in the strip is encoded. When the encoding of one strip is completed, ENC_EOS, indicating that the encoding of the strip is complete, is generated, and the encoding of the strips is repeated until the end of the page. The line memory can be initialized when the encoding of the strip is started if it is necessary. When the encoding operation of all lines in the page is complete, the interrupt message ENC_INT, indicating that the completion of the encoding operation, is sent to the main processor 200.

The main processor 200 sets a size of the image to be decoded or required parameters in a special function register (not shown) of the codec. Then, the main processor sends a DEC_SOP signal, commanding the decoding one page, to the codec. The codec starts the decoding operation according to the set parameters, and generates an interrupt message (DEC_INT) indicating that the completion of the decoding operation, to the main processor 200 when the decoding of the page is complete.

When the codec receives the SEC_SOP signal from the main processor 200, the codec initializes all registers that relate to the decoding operation and decoding line memories (DLM).

Figure 5:
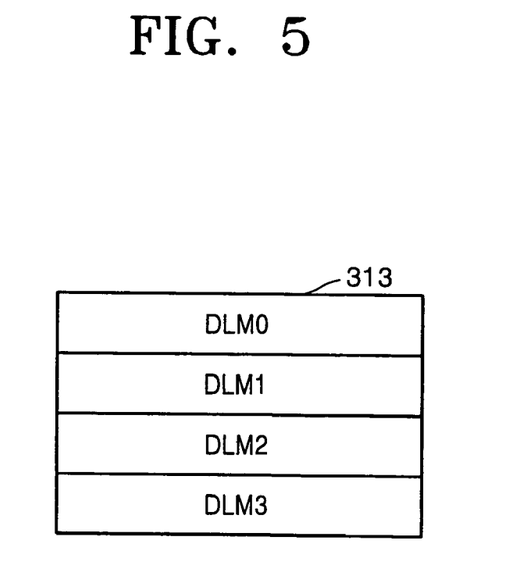
FIG. 5 is a view for describing structure of a decoding line memory.

FIG. 5 illustrates the DLM 313 including four lines, and table 2 shows an operational state of the DLM. The DLM can be used as the storage line WL, the reference line RL1 and R12 referred to during the decoding operation, and a reading line RDL that outputs the data. In the MH/MR/MMR decoding operation, three lines, that is, the storage line WL, the reference line RL1, and the reading line RDL are used, and in the JBIG decoding operation, four lines, that is the storage line (WL), a first reference line (RL1), a second reference line (RL2) and the read line (RDL), are used. The following description is based on the JBIG decoding operation.

TABLE 2

| Line number | Line 1 | Line 2 | Line 3 | Line 4 | Line 5 | Line 6 | ... |
|---|---|---|---|---|---|---|---|
| DLM0 | WL | RL1 | RL2 | RDL | WL | RL1 | ... |
| DLM1 |  | WL | RL1 | RL2 | RDL | WL | ... |
| DLM2 |  |  | WL | RL1 | RL2 | RDL | ... |
| DLM3 |  |  |  | WL | RL1 | RL2 | ... |

When initialization of the memory is complete, a DEC_SOL signal commanding the initiation of the line decoding operation, is generated. The decoding input unit 310 receives data required for the decoding operation and transmits the data to the decoding core 311, and the decoding core 311 performs the decoding operation with respect to each of the lines. The decoded data is stored in the storage line, and the data of the read line can be directly transmitted to the system memory 202 using the DMA method, and then transmitted to the router 206 for re-encoding.

When the decoding core 311 completes the decoding of one line, DEC_EOL, indicating the completion of the decoding of one line, is generated. Also, the data of one line is stored in the storage line WL of the line memory, thereby making the storage line WL in a full state. When the transmission of data by the reading line RDL is complete, the memory of the reading line is in an empty state. In addition, information representing the storage line WL, the reference line RL1 and RL2 and the reading line RDL is corrected in order to decode the next line.

The image data is input into the decoding input unit 310 from the system memory 202. The decoding input unit 310 receives 128 bits of data (that is, 32 bits×4 bursts) and includes two 128-bit registers like the encoding input unit 300. When a register is in a full state, 32 bits of data is transmitted to the decoding core 311 at one time in response to a request from the decoding core 311, and the empty register waits for more image data to be input. The decoding output unit 312 outputs the decoded image data.

The decoding output unit 312 divides the decoded image data transmitted from the decoding core 311 into 32-bit units and stores the divided data in the DLM. When the decoding operation of the decoding core 311 with respect to one line is complete, the storage line of the line memory is in a full state. The decoding output unit 312 may transmit the decoded data to the system memory 202 using the DMA method, or transmit the decoded data to the router for the re-encoding operation.

When the decoding operation of one line is completed so DEC_EOL signal is generated, the storage line WL is in a full state, and the reading line RDL is in an empty state, then DEL_SOL for the next line is generated. The line decoding operation is performed until the last line of the strip is decoded. When the decoding of one strip is complete, the strip decoding operation is repeated until the last strip of the page is decoded. The memory is initialized whenever the decoding of a new strip starts if necessary. When all of the lines of one page are decoded, the interrupt message DEC_INT, indicating the completion of decoding, is transmitted to the main processor 200.

The main processor 200 sets the size of an image that will be decoded or encoded and parameters in the shift register of the codec. Then the main processor 200 sends the DEC_SOP signal commanding the decoding operation and the ENC_SOP signal commanding the encoding operation simultaneously to the codec. The codec performs the decoding operation after reading the encoded data from the system memory 202, and encodes the decoded data stored in the internal memory via the router. After encoding one page, the codec generates the signal DEC_INT notifying the main processor 200 that the operation is complete.

When the codec receives the signal DEC_SOP from the main processor 200, the codec initializes all of the registers related to the decoding operation and initializes the DLMs. After initializing the memory, the signal DEC_SOL is generated, and the decoding input unit 310 receives the data required for the decoding operation and transmits the data to the decoding core 311. The decoding core 311 performs the decoding operation with respect to each of the lines. The data in the read line is transmitted to the line memory storage line of the codec encoding unit via the router.

When the codec receives the signal ENC_SOP from the main processor 200, the codec initializes all registers related to the encoding operation and ELM 303. In order to store the data in the line memory storage line, the status of the read line in the decoding output unit should be identified. If the read line is in a full state, the data is transmitted via the router and stored in the storage line of the ELM 303. The data is encoded using the coding line and the reference line, and stored in the storage line simultaneously. When the data is stored in the storage line, the encoding of one line is complete. The line encoding operation is repeated until the entire page is encoded.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multi-functional image processing apparatus comprising:
    an image processor processing sensing data input from various sensors and generating image data;
    a first codec to selectively perform one of an encoding of the image data or decoding of encoded image data using a first encoding method to generate respective first encoded data or first decoded data based on the first codec selection between the encoding and decoding;
    a second codec to selectively perform one of an encoding of the image data or decoding of the encoded image data using a second encoding method to generate respective second encoded data or second decoded data based on the second codec selection between the encoding and decoding;
    a system memory to store the image data, the first and second encoded data, and the first and second decoded data;
    a main processor to control other components of the apparatus; and
    a router to transmit the image data to at least one of the first codec and the second codec for encoding the image data, to transmit the encoded image data to at least one of the first codec and second codec for decoding the encoded image data, and to selectively provide a codec-to-codec communication of codec decoded data by one of:
        transmitting the first decoded data, as a partial decoding of plural partial decodings produced by the first codec that in combination represent an entire decoded image of an entire encoded image, from the first codec to the second codec with simultaneous encoding of the decoded image by the second codec and decoding of the encoded image by the first codec to produce another partial decoding of the plural partial decodings produced by the first codec; and
        transmitting the second decoded data, as a partial decoding of plural partial decodings produced by the second codec that in combination represent an entire decoded other image of entire encoded other image, from the second codec to the first codec with simultaneous encoding of the decoded other image by the first codec and decoding of the encoded other image by the second codec to produce another partial decoding of the plural partial decodings produced by the second codec; and
    an encoding line memory to store first or second data to be respectively encoded into the first or second encoded data,
    wherein respective encodings of the image data are performed on a line unit using the encoding line memory when the encoding line memory is in a full state, of plural states, and
    wherein each of the first codec and the second codec comprises
    a decoding line memory to store the corresponding first or second decoded data configured such that the router accesses the decoding line memory to transmit, in line units, each respective partial decodings of plural partial decodings of a corresponding encoded image.

2. The apparatus of claim 1, wherein the first encoding method is a joint bi-level image experts group (JBIG) codec method.

3. The apparatus of claim 2, wherein the joint bi-level image experts group (JBIG) codec performs JBIG encoding/decoding of the image data or decoded data.

4. The apparatus of claim 1, wherein the second encoding method is a modified Hoffman (MH)/modified READ (MR)/modified MR (MMR) codec method.

5. The apparatus of claim 4, wherein the modified Hoffman (MH)/modified READ (MR)/modified MR (MMR) codec performs International Telegraph and Telephone Consultative Committee Group 3 and Group 4 (CCITT G3/G4) encoding and decoding operations.

6. The apparatus of claim 1, wherein the encoding line memory comprises:
    a storage line reading and storing the image data or the corresponding first or second decoded data;
    a coding line encoding the image data or the corresponding first or second decoded data; and
    a reference line.

7. The apparatus of claim 1, wherein the decoding line memory comprises:
 a storage line reading and storing the image data or the corresponding first or second decoded data;
 a reference line; and
 a reading line outputting the corresponding first or second decoded data to an external apparatus.

8. The apparatus of claim 1, wherein the router transmits the first decoded data to the second codec to be encoded when the first decoded data is originally encoded using the first encoding method, and the router transmits the second decoded data to the first codec to be encoded when the second decoded data is originally encoded using the second encoding method.

9. The apparatus of claim 1, wherein the router transmits the image data to the first codec or to the second codec from the image processor in order to encode the image data.

10. The apparatus of claim 1, wherein the image processor performs gamma correction and shading correction, image quality improvement and binary gray scale conversion.

11. The apparatus of claim 1, wherein in a scanning operation, the image data is transmitted to the system memory using a direct memory access (DMA) method.

12. The apparatus of claim 1, wherein in a printing operation, data read from the system memory using a direct memory access (DMA) method is transmitted to a printer engine through a printer interface.

13. The apparatus of claim 1, wherein in a copying operation, the image data is transmitted to a printer engine through a printer interface.

14. The apparatus of claim 1, wherein in a fax sending operation, the image data output from the image processor is read by one of the codecs using a direct memory access (DMA) method to encode the image data, and the encoded data is stored in the system memory or transmitted using the DMA method.

15. The apparatus of claim 1, wherein in a fax receiving operation, received data is stored in the system memory, transmitted to one of the codecs using a direct memory access (DMA) method to decode the data stored in the system memory, and the decoded data is transmitted to a printer engine through a printer interface.

16. The apparatus of claim 1, wherein the encoding and decoding methods include a single-encoding method, a single-decoding method, a scan-to-encoding method, and a decoding-to-encoding method.

17. The apparatus of claim 16, wherein in the single-encoding method, the image data and the first and second decoded data stored in the system memory is encoded.

18. The apparatus of claim 16, wherein in the single-decoding method, the first and second encoded data stored in the system memory is decoded.

19. The apparatus of claim 16, wherein in the scan-to-encoding method, a scanned image is decoded by one of the codecs.

20. The apparatus of claim 16, wherein in the decoding-to-encoding method, the first and second encoded data is decoded using a joint bi-level image experts group (JBIG) codec method.

21. The apparatus of claim 1, wherein each of the first codec and the second codec comprises:
 a data input unit receiving one of the image data, the corresponding first or second encoded data, or the corresponding first or second decoded data;
 a decoding unit decoding the corresponding first or second encoded data;
 an encoding unit encoding the image data or the corresponding first or second decoded data; and
 a data output unit outputting either the corresponding first or second encoded data or the corresponding first or second decoded data.

22. A multi-functional image processing apparatus comprising:
 an image processor processing sensing data input from various sensors and generating image data of an image, distinct from image data for another image;
 a first codec to perform an encoding of the image data and outputting of the encoded image data using a first encoding method, the first codec outputting the entire encoded image data by sequentially outputting plural partial encodings of the entire image data during the encoding of the entire image data;
 a second codec to selectively perform a decoding of the encoded image data and an outputting of the decoded image data using a second encoding method, the second codec outputting the entire decoded image data by sequentially outputting plural partial decodings of the encoded image data during the decoding of the entire encoded image data, wherein the second codec simultaneously decodes the encoded image data based upon sequential receipt of the plural partial encodings from the first codec while the first codec is still encoding the entire image data;
 a router to control transmission of the sequentially output plural partial encodings from the first codec to the second codec,
 wherein the image data is partially encoded by the first codec through a line unit, using an input line memory for the first codec, when the input line memory for the first codec is determined to be in a full state, of plural states,
 wherein the encoded image data is partially decoded by the second codec through a line unit, using an output line memory for the first codec to store the first codec output partial encodings of the entire first codec output encoded image data in line units, configured such that the router accesses the output line memory for the first codec to sequentially transmit the respective partial encodings to an input line memory of the second codec,
 wherein the second codec selectively performs one of the decoding of the encoded image data, decoding other image data of another encoded image using an input line memory for the second codec, and encoding image data of a further other image using the input line memory for the second codec, wherein the input line memory for the second codec includes encoded or decoded image data in line units.

23. The multi-functional image processing apparatus of claim 22, wherein the second codec selectively performs the one of the decoding of the encoded image data, the decoding of the other image data of the other encoded image, and the encoding of the image data of the further other image based on an input codec operation selection.

24. A multi-functional image processing apparatus comprising:
 a first codec to perform a decoding of encoded image data of an image, distinct from other encoded image data of another image, and an outputting of the decoded image data using a first decoding method, the first codec outputting the entire decoded image data by sequentially outputting plural partial decodings of the entire encoded image data during the decoding of the entire encoded image data;

a second codec to selectively perform an encoding of the decoded image data and an outputting of the encoded image data using a second encoding method, the second codec outputting the entire encoded image data by sequentially outputting plural partial encodings of the decoded image data during the encoding of the entire decoded image data, wherein the second codec simultaneously encodes the decoded image data based upon sequential receipt of the plural partial decodings from the first codec while the first codec is still decoding the entire encoded image data;

a router to control transmission of the sequentially output plural partial decodings from the first codec to the second codec, wherein the encoded image data is partially decoded by the first codec through a line unit, using an input line memory for the first codec, wherein the decoded image data is partially encoded by the second codec through a line unit, using an output line memory for the first codec to store the first codec output partial decodings of the entire first codec output decoded image data in line units, configured such that the router accesses the output line memory for the first codec to sequentially transmit the respective partial decodings to an input line memory of the second codec, wherein the second codec selectively performs one of the encoding of the decoded image data, when the input line memory for the second codec is determined to be in a full state, of plural states, decoding another encoded image data of another image using the input line memory for the second codec, and decoding image data of a further other image using the input line memory for the second codec, wherein the input line memory for the second codec includes encoded or decoded image data in line units.

25. The multi-functional image processing apparatus of claim 24, wherein the second codec selectively performs the one of the encoding of the decoded image data, the decoding of the other encoded image data of the other image, and the decoding of the image data of the further other image based on an input codec operation selection.

* * * * *

UNITED STATES PATENT AND TRADEMARK OFFICE
CERTIFICATE OF CORRECTION

| | | |
|---|---|---|
| PATENT NO. | : 8,126,295 B2 | Page 1 of 1 |
| APPLICATION NO. | : 10/942972 | |
| DATED | : February 28, 2012 | |
| INVENTOR(S) | : Eul-hwan Lee et al. | |

It is certified that error appears in the above-identified patent and that said Letters Patent is hereby corrected as shown below:

Column 12, Line 26, In Claim 1, after "of" insert -- an --.

Signed and Sealed this
Twenty-second Day of May, 2012

David J. Kappos
*Director of the United States Patent and Trademark Office*